(12) United States Patent
Brandt et al.

(10) Patent No.: US 12,522,140 B2
(45) Date of Patent: Jan. 13, 2026

(54) ELECTRONIC MIRROR

(71) Applicant: Harman Becker Automotive Systems GmbH, Karlsbad (DE)

(72) Inventors: Peter Brandt, Pfinztal (DE); Jörg Welke, Ettlingen-Schöllbronn (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 552 days.

(21) Appl. No.: 18/059,282

(22) Filed: Nov. 28, 2022

(65) Prior Publication Data

US 2023/0173981 A1    Jun. 8, 2023

(30) Foreign Application Priority Data

Dec. 7, 2021 (EP) .................................... 21212724

(51) Int. Cl.
| | |
|---|---|
| *B60R 1/08* | (2006.01) |
| *B60R 1/00* | (2022.01) |
| *B60R 1/04* | (2006.01) |
| *B60R 1/25* | (2022.01) |
| *B60R 1/26* | (2022.01) |
| *G02F 1/1335* | (2006.01) |

(52) U.S. Cl.
CPC ............. *B60R 1/088* (2013.01); *B60R 1/006* (2013.01); *B60R 1/04* (2013.01); *B60R 1/25* (2022.01); *B60R 1/26* (2022.01); *G02F 1/133553* (2013.01)

(58) Field of Classification Search
CPC .. B60R 1/088; B60R 1/25; B60R 1/26; B60R 1/006; B60R 1/04; G02F 1/133553; G02F 1/133536; G02B 5/30; G02B 5/3016

USPC ................................. 359/253, 259, 838, 844
See application file for complete search history.

(56) References Cited

U.S. PATENT DOCUMENTS

| | | | | |
|---|---|---|---|---|
| 4,623,222 A | * | 11/1986 | Itoh ......................... | B60R 1/088 |
| | | | | 349/114 |
| 6,111,683 A | * | 8/2000 | Cammenga ........... | B60R 1/1207 |
| | | | | 359/267 |

(Continued)

OTHER PUBLICATIONS

European Patent Office, Extended European Search Report Issued in Application No. 21212724.5, Apr. 20, 2022, Germany, 7 pages.

*Primary Examiner* — Ricky D Shafer
(74) *Attorney, Agent, or Firm* — McCoy Russell LLP

(57) ABSTRACT

An electronic mirror comprises a liquid crystal cell, wherein the liquid crystal cell comprises a first transparent electrode, a second transparent electrode, a liquid crystal layer comprising liquid crystal molecules arranged between the first transparent electrode and the second transparent electrode, and an AC voltage source configured to apply an alternating voltage across the liquid crystal layer between the first transparent electrode and the second transparent electrode, wherein, when a voltage is applied across the liquid crystal layer, the liquid crystal molecules in the liquid crystal layer change their orientation, and the electronic mirror is configured to apply a varying voltage across the liquid crystal layer which gradually decreases from outer areas towards the center of the liquid crystal layer such that the refraction index of the liquid crystal layer gradually varies from outer areas towards the center of the liquid crystal layer.

17 Claims, 3 Drawing Sheets

(56) References Cited

U.S. PATENT DOCUMENTS

| | | | | |
|---|---|---|---|---|
| 6,987,598 | B2* | 1/2006 | Wada | G11B 7/0948 |
| | | | | 359/254 |
| 10,303,030 | B2* | 5/2019 | Robinson | G02B 6/0068 |
| 2002/0080463 | A1* | 6/2002 | Tonar | B60R 1/088 |
| | | | | 359/267 |
| 2002/0140884 | A1* | 10/2002 | Richard | G02F 1/1397 |
| | | | | 349/113 |
| 2006/0007550 | A1* | 1/2006 | Tonar | B60R 1/088 |
| | | | | 359/604 |
| 2008/0068520 | A1 | 3/2008 | Minikey, Jr. et al. | |
| 2014/0340728 | A1* | 11/2014 | Taheri | G02F 1/133528 |
| | | | | 359/250 |
| 2016/0320684 | A1 | 11/2016 | Galstian | |
| 2018/0024409 | A1* | 1/2018 | Yasumoto | G02B 27/0101 |
| | | | | 348/148 |
| 2018/0173035 | A1 | 6/2018 | Port et al. | |
| 2021/0157202 | A1* | 5/2021 | Kumeta | G02F 1/1347 |

\* cited by examiner

ELECTRONIC MIRROR

CROSS REFERENCE TO RELATED APPLICATIONS

The present application claims priority to European Patent Application No. 21212724.5, entitled "ELECTRONIC MIRROR", and filed on Dec. 7, 2021. The entire contents of the above-listed application is hereby incorporated by reference for all purposes.

TECHNICAL FIELD

The disclosure relates to an electronic mirror, in particular to an electronic mirror for a vehicle.

BACKGROUND

Mirrors are generally critical to automotive safety. Conventional mirrors have several limitations such as, e.g., excessive glare, limited field of view, damage susceptibility and aerodynamic drag. Electronic mirrors, which more and more enhance or replace traditional rear and side-view mirrors, significantly increase vehicle safety, comfort and convenience.

SUMMARY

An electronic mirror includes a liquid crystal cell, wherein the liquid crystal cell includes a first transparent electrode, a second transparent electrode, a liquid crystal layer including liquid crystal molecules arranged between the first transparent electrode and the second transparent electrode, and an AC voltage source configured to apply an alternating voltage across the liquid crystal layer between the first transparent electrode and the second transparent electrode, wherein, when a voltage is applied across the liquid crystal layer, the liquid crystal molecules in the liquid crystal layer change their orientation, and the electronic mirror is configured to apply a varying voltage across the liquid crystal layer which gradually decreases from outer areas towards the center of the liquid crystal layer such that the refraction index of the liquid crystal layer gradually varies from outer areas towards the center of the liquid crystal layer.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

Figure 1:
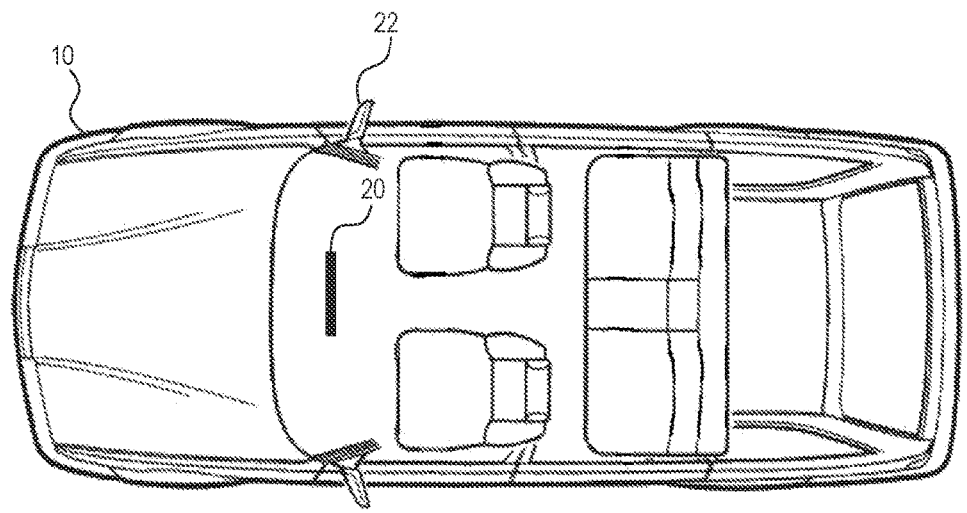
FIG. 1 schematically illustrates a vehicle comprising rear and side-view mirrors.

Referring to FIG. 1, a vehicle 10 is schematically illustrated. The vehicle 10 comprises rear and side view mirrors 20, 22. In the past, conventional mirrors were used for rear (class I mirrors) and side view mirrors (class III mirrors). In order to provide a certain amount of magnification, a surface of a conventional mirror may be curved. Conventional mirrors, however, are replaced more and more by electronic mirrors. Electronic mirrors comprise a display such as, e.g., a TFT (Thin film transistor) display. One or more cameras may be mounted on the vehicle 10 which capture images of the surroundings of the vehicle 10. Such images may then be displayed on the display of the electronic mirror. Electronic mirrors provide several advantages over conventional mirrors. However, rear and side-view mirrors are safety critical components, Therefore, if the electronic mirror fails for whatever reason (e.g., failure of the cameras or the display), the mirror functionality still has to be ensured.

Figures 2A, 2B:
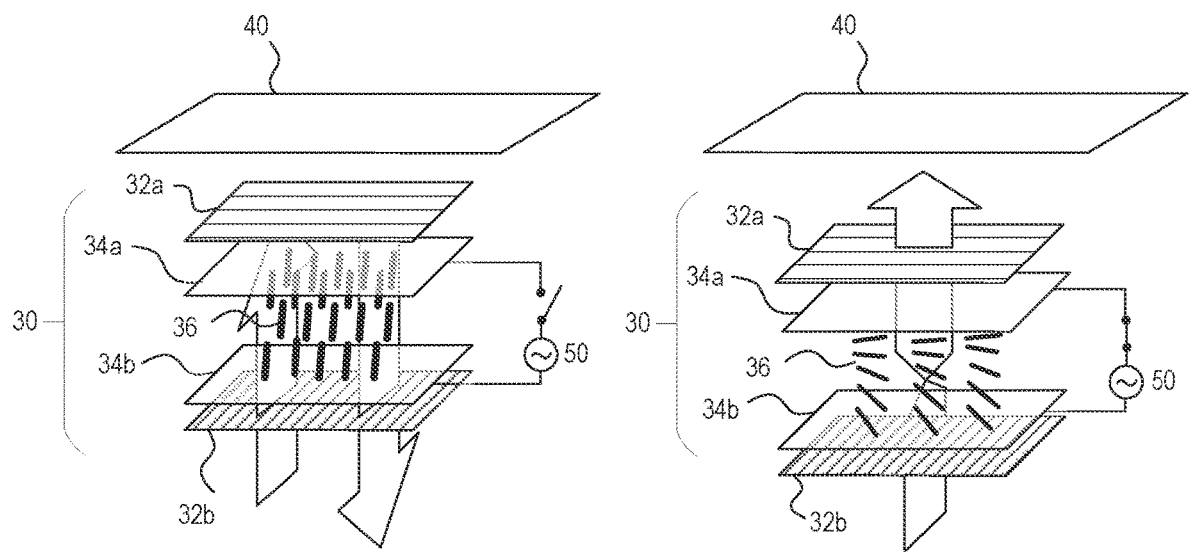
FIG. 2, including FIGS. 2A and 2B, schematically illustrates the general principle of an electronic mirror.

For this reason, a liquid crystal cell 30 may be arranged in front of the display 40. This is schematically illustrated in FIG. 2. The liquid crystal cell 30 comprises a first transparent electrode 34a, a second transparent electrode 34b, and a liquid crystal layer 36 comprising liquid crystal molecules arranged between the first transparent electrode 34a and the second transparent electrode 34b. The liquid crystal cell 30 further comprises an AC voltage source 50 (only referred to as voltage source in the following) configured to apply an alternating voltage across the liquid crystal layer 36 between the first transparent electrode 34a and the second transparent electrode 34b. When no voltage is applied to the liquid crystal layer 36, the liquid crystal molecules are oriented in a first direction (see FIG. 2A). For example, the liquid crystal molecules may be arranged perpendicular to the first and second transparent electrodes 34a, 34b. This allows polarized light to be transmitted through the liquid crystal layer 36.

The liquid crystal cell 30 may further comprise a polarizing filter 32b (which may be a polarizing filter layer), wherein the second transparent electrode 34b is arranged between the polarizing filter layer 32b and the liquid crystal layer 36, and a reflective polarizing filter 32a (which may be a reflective polarizing filter layer), wherein the first transparent electrode 34a is arranged between the reflective polarizing filter 32a and the liquid crystal layer 36. The polarizing filter 32b and the reflective polarizing filter 32a may be arranged such that the transmission axis of the polarizing filter 32b and the transmission axis of the reflective polarizing filter 32a are perpendicular to each other, as is indicated in FIG. 2A. The reflection axis of the reflective polarizing filter 32a, therefore, is arranged such that light that is polarized by the polarizing filter 32b and transmitted through the liquid crystal layer 36 is reflected on the surface of the reflective polarizing filter 32a. That is, when no voltage is applied across the liquid crystal layer 36, the liquid crystal cell 30 functions in a similar way as a conventional mirror. The display 40 in this case is not visible through the liquid crystal cell 30.

Now referring to FIG. 2B, if a voltage (liquid crystal cells generally require that an alternating voltage be applied) is applied across the liquid crystal layer 36, the liquid crystal molecules in the liquid crystal layer 36 change their orientation. For example, the liquid crystal molecules may twist and tip towards a plane that is parallel to the first and second transparent electrodes 34a, 34b. If the applied voltage is larger than a threshold voltage, the liquid crystal molecules tip to such an extent that the polarized light transmitted through the liquid crystal layer 36 is rotated by 90° and is therefore transmitted through the reflective polarizing filter 32a. The display 40 is then visible behind the liquid crystal cell 30 and contents displayed on the display 40 are visible through the liquid crystal cell 30. When images captured by cameras on the outside of the vehicle 10 are displayed on the display 40, a voltage that is larger than the threshold voltage may be applied to the liquid crystal layer 36 such that the electronic mirror function is active.

The reflective polarizing filter 32a, however, has a flat surface in order to allow the light to pass through the reflective polarizing filter 32a undisturbed when a voltage is applied to the liquid crystal layer 36 (e-mirror function active). A flat reflective polarizing filter 32a in the reflective mode (no voltage applied to the liquid crystal layer 36 and e-mirror function inactive), however, does not provide any magnification.

In order to provide a magnification of the reflected images in the reflective mode, the electronic mirror according to one example is configured to apply a varying voltage across the liquid crystal layer 36 which gradually decreases from outer areas towards the center of the liquid crystal layer 36 such that the refraction index of the liquid crystal layer 36 gradually varies from outer areas towards the center of the liquid crystal layer 36. The liquid crystal layer 36 generally comprises a certain refraction index. For example, the liquid crystal layer 36, when no voltage is applied to the liquid crystal layer 36, may have a refraction index of 1.5 or more. This refraction index, however, generally depends on several different parameters. In particular, the refraction index of the liquid crystal layer 36 changes as a function of the voltage applied across the liquid crystal layer 36. That is, if a first voltage is applied to a first area of the liquid crystal layer 36 and a second voltage, which is lower than the first voltage, is applied to a second area of the liquid crystal layer 36, the refractive index of the first area differs from the refractive index of the second area.

By applying a suitable voltage profile to the liquid crystal layer 36, a spherical or aspherical mirror reflective index profile may be generated. The focusing power of the electronic mirror can be controlled by the variation of the electric field applied to the liquid crystal layer 36 and the frequency of the electric field. The birefringent properties of the liquid crystal layer 36 in combination with a reflective polarizing filter 32a may be used to provide variable focusing properties by dynamically changing the refractive index of the liquid crystal layer 36.

Figure 3:
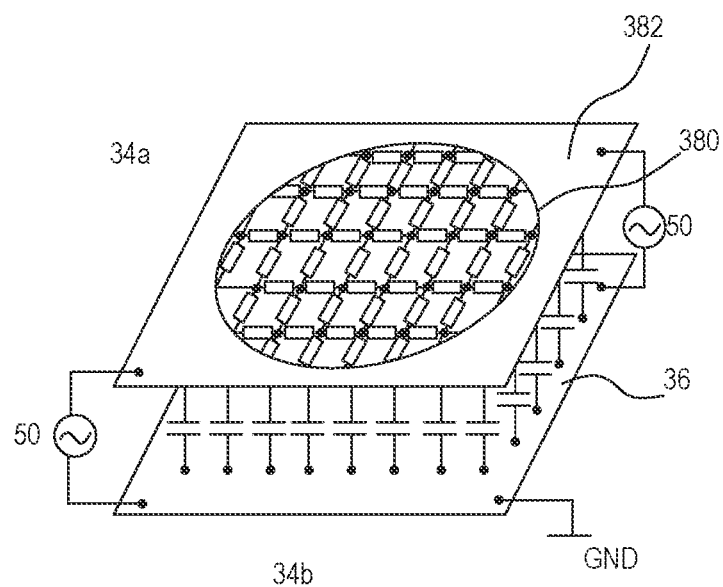
FIG. 3 schematically illustrates an example of an electronic mirror according to the present disclosure.

Now referring to FIG. 3, one example of an electronic mirror is schematically illustrated. In this example, the first transparent electrode 34a comprises a first area 380 which causes a voltage applied across the liquid crystal layer 36 to gradually decrease from areas of the liquid crystal layer 36 arranged adjacent to outer areas of the first area 380 towards areas of the liquid crystal layer 36 arranged adjacent to the center of the liquid crystal layer 36. This can be achieved, for example, by a first area 380 having a high resistivity (electrical contactivity or sheet resistance) such as, e.g., 50 $\Omega$/sq (also denoted ohms square, $\Omega\square$, or $\Omega/\square$) or more. The first area 380 may be surrounded by a second area 382 of the first transparent electrode 34a, wherein the second area 382 is configured to apply the same voltage to all areas of the liquid crystal layer 36 that are arranged adjacent to the second area 382. The resistivity of the second area 382, for example, may be significantly lower than the resistivity of the first area 380, such that the resistivity does not significantly influence the resulting voltage that is applied to the areas of the liquid crystal layer 36 which are arranged adjacent to the second area 382. That is, the same voltage is applied to all areas of the liquid crystal layer 36 that are arranged below the second area 382 and below the edge region of the first area 380. However, this voltage decreases towards the center of the first area 380, due to the high resistivity of the first area 380.

Figure 4:
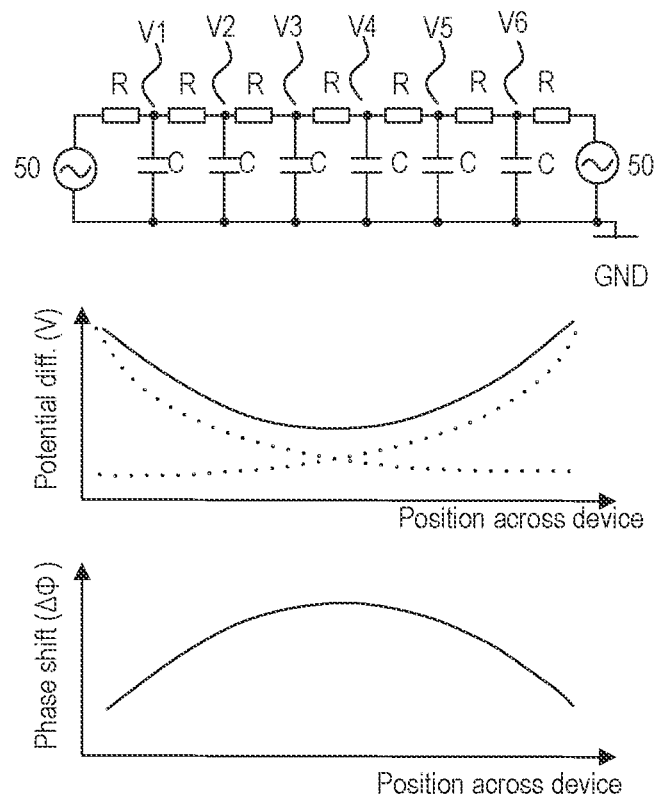
FIG. 4 schematically illustrates an equivalent circuit of the electronic mirror of FIG. 3 and different diagrams illustrating the potential difference and the phase shift depending on the position across the electronic mirror.

This is further illustrated by means of the equivalent circuit shown in FIG. 4 (top). The first area 380 can be seen as a plurality of resistors R. Each resistor R causes a voltage drop. That is, a voltage V1, V6 applied to the liquid crystal layer 36 in areas below the edge region of the first area 380 is greater than a voltage V3, V4 applied to the liquid crystal layer 36 in areas below a center of the first area 380. The liquid crystal layer 36 in the equivalent circuit of FIG. 4 is represented by capacitors C. In FIG. 4 only seven resistors R are exemplarily illustrated. The first area 380, however, can be seen as being represented by a much greater number of resistors R, resulting in a gradual decrease of the voltage V towards the center of the first area 380. This gradual decrease of the voltage (potential difference) as a function of the position across the first area 380 is schematically illustrated in the upper diagram in FIG. 4. As has been described above, a different voltage applied to the liquid crystal layer 36 results in a different refraction index. As can be seen in the lower diagram of FIG. 4, the resulting phase profile is an inversion of the voltage profile.

In FIG. 4, the voltage and phase profiles are schematically illustrated along one line through the liquid crystal layer 36. As can be seen in FIG. 3, the first area 380 may have a round shape, for example. Due to the low resistivity of the second area 382, if the same voltage is applied to two opposite ends of the first transparent electrode 34a (voltage source 50 is coupled to two opposing ends of each of the first transparent electrode 34a and the second transparent electrode 34b), the same voltage is applied along the entire circumference of the first area 380 (due to the low resistivity of the second area 382). The voltage decreases from each point along the circumference of the first area 380 towards the center of the first area 380. The resulting phase profile in this case is parabolic with its maximum located at the center of the first area 380 which, in the present example corresponds to the center of the liquid crystal layer 36. A parabolic phase profile results in the liquid crystal cell 30 resembling a cylindrical lens. Therefore, if an annular shaped second area 382 is used to surround and electrically connect the first area 380 to the driving potential, this results in a bowl shaped potential and a phase profile that is similar to a spherical lens. In this way, magnification can be achieved in the reflective mode of the arrangement. In order to ensure that the mirror remains in the reflective mode, the voltage applied to the liquid crystal layer 36 may be below the threshold voltage that would be necessary to activate the e-mirror function.

In the examples illustrated above, a varying voltage profile across the liquid crystal layer 36 is generated by means of a high resistivity area (e.g., first area 380). This, however, is only one example. A varying voltage profile, generally, can also be generated by any other suitable means.

Figure 5:
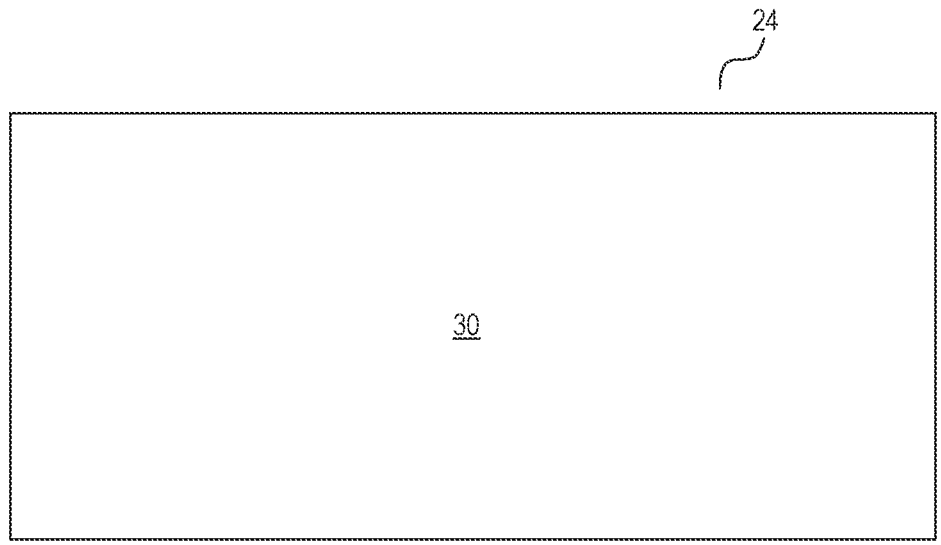
FIG. 5 schematically illustrates an electronic mirror according to one example.
Figure 6:
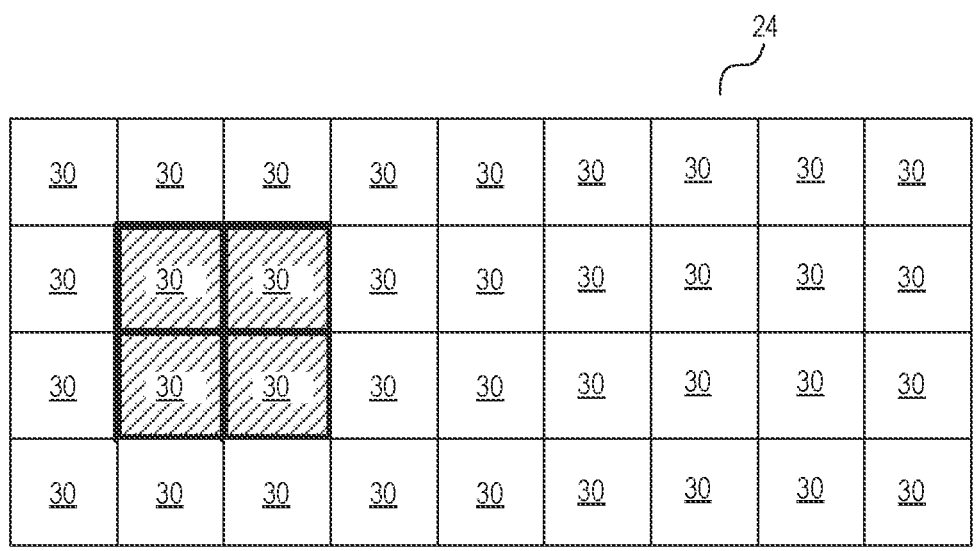
FIG. 6 schematically illustrates an electronic mirror according to another example.

As is illustrated in FIG. 5, an electronic mirror 24 (e.g. a rear view mirror) may comprise a single liquid crystal cell 30. In this way, magnification can be provided over the entire area of the electronic mirror 24. As is illustrated in FIG. 6, however, it is also possible that an electronic mirror 24 comprises a plurality of liquid crystal cells 30. The liquid crystal cells 30 may be arranged in a regular pattern, for example. Each liquid crystal cell 30 can be controlled individually. That is, magnification can be provided for only some of the liquid crystal cells 30. If, for example, an object is reflected in the electronic mirror 24 (e.g., a vehicle or motorcyclist approaching from behind) which may represent a potential danger, this object may be highlighted by magnifying it. That is, one or more, but not all of the liquid crystal cells 30 may be provided with a voltage that is below the threshold voltage such that magnification is provided but the liquid crystal cell 30 is still in the reflective mode, while other liquid crystal cells 30 are not provided with a voltage (OFF state, reflective mode). A position of an object that is to be highlighted by magnification on the electronic mirror 24 can be determined by any suitable means.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

The invention claimed is:

1. An electronic mirror comprises a plurality of liquid crystal cells, wherein each of the plurality of liquid crystal cell comprises:
   a first transparent electrode;
   a second transparent electrode; and
   a liquid crystal layer comprising liquid crystal molecules arranged between the first transparent electrode and the second transparent electrode, wherein the electric mirror further comprises an AC voltage source configured to apply an alternating voltage across the liquid crystal layers of the plurality of liquid crystal cells between the respective first transparent electrode and second transparent electrode, wherein:
      when a voltage is applied across the liquid crystal layers of the plurality of liquid crystal cells, the liquid crystal molecules in the liquid crystal layers change their orientation, and
   wherein the electronic mirror is configured to apply a varying voltage across the liquid crystal layers of the plurality of liquid crystal cells which gradually decreases from outer areas towards a center of each respective liquid crystal layer such that a refraction index of the respective liquid crystal layer gradually varies from the outer areas towards the center of the liquid crystal layer.

2. The electronic mirror of claim 1, wherein in each of the plurality of liquid crystal cells, the first transparent electrode comprises a first area which causes a voltage applied across the liquid crystal layer to gradually decrease from areas of the liquid crystal layer arranged adjacent to outer areas of the first area towards areas of the liquid crystal layer arranged adjacent to the center of the liquid crystal layer.

3. The electronic mirror of claim 2, wherein the first area is surrounded by a second area of the first transparent electrode, and wherein the second area is configured to apply a same voltage to all areas of the liquid crystal layer that are arranged adjacent to the second area.

4. The electronic mirror of claim 3, wherein a resistivity of the first area is greater than a resistivity of the second area.

5. The electronic mirror of claim 2, wherein a resistivity of the first area is 55 Ω/sq or more.

6. The electronic mirror of claim 2, wherein the first area has a round cross-sectional area.

7. The electronic mirror of claim 1, wherein each of the plurality of liquid crystal cell further comprises:
   a polarizing filter layer, wherein the second transparent electrode is arranged between the polarizing filter layer and the liquid crystal layer; and
   a reflective polarizing filter layer, wherein the first transparent electrode is arranged between the reflective polarizing filter layer and the liquid crystal layer.

8. The electronic mirror of claim 7, wherein a transmission axis of the polarizing filter layer and a transmission axis of the reflective polarizing filter layer are perpendicular to each other.

9. The electronic mirror of claim 1, wherein the liquid crystal layer of each of the plurality of liquid crystal cells, when no voltage is applied to the liquid crystal layer, has a refraction index of 1.5 or more.

10. The electronic mirror of claim 1, wherein the AC voltage source is coupled to two opposing ends of each of the first transparent electrode and the second transparent electrode.

11. The electronic mirror of claim 1, wherein each of the plurality of liquid crystal cells can be controlled independently.

12. The electronic mirror of claim 1, wherein the electronic mirror is included in one of a rear mirror of a vehicle and a side-view mirror of the vehicle.

13. The electronic mirror of claim 1, further comprising a display, wherein the first transparent electrode of each of the plurality of liquid crystal cells is arranged between the display and the liquid crystal layer.

14. The electronic mirror of claim 13,
wherein contents displayed on the display are not visible through the plurality of liquid crystal cells if a voltage applied across the liquid crystal layer is below a threshold voltage; and
wherein contents displayed on the display are visible through the plurality of liquid crystal cells if the voltage applied across the liquid crystal layers is greater than the threshold voltage.

15. An electronic mirror, comprising:
a liquid crystal cell, comprising:
   a first transparent electrode;
   a second transparent electrode;
   a liquid crystal layer comprising liquid crystal molecules arranged between the first transparent electrode and the second transparent electrode; and
   an AC voltage source coupled to two opposing ends of each of the first transparent electrode and the second transparent electrode, the AC voltage source configured to apply an alternating voltage across the liquid crystal layer between the first transparent electrode and the second transparent electrode, wherein:
      when a voltage is applied across the liquid crystal layer, the liquid crystal molecules in the liquid crystal layer change their orientation; and
      the electronic mirror is configured to apply a varying voltage across the liquid crystal layer which gradually decreases from outer areas towards a center of the liquid crystal layer such that a refraction index of the liquid crystal layer gradually varies from the outer areas towards the center of the liquid crystal layer.

16. An electronic mirror, comprising:
a display; and
a liquid crystal cell comprising:
   a first transparent electrode;
   a second transparent electrode;
   a liquid crystal layer comprising liquid crystal molecules arranged between the first transparent electrode and the second transparent electrode, wherein the first transparent electrode is arranged between the display and the liquid crystal layer; and
   an AC voltage source configured to apply an alternating voltage across the liquid crystal layer between the first transparent electrode and the second transparent electrode, wherein:
      when a voltage is applied across the liquid crystal layer, the liquid crystal molecules in the liquid crystal layer change their orientation; and
      the electronic mirror is configured to applying a varying voltage across the liquid crystal layer which gradually decreases from outer areas towards a center of the liquid crystal layer such that a refraction index of the liquid crystal layer gradually varies from the outer areas towards the center of the liquid crystal layer.

17. The electronic mirror of claim 16, wherein:
contents displayed on the display are not visible through liquid crystal cell if a voltage applied across the liquid crystal layer is below a threshold voltage; and
contents displayed on the display are visible through the liquid crystal cell if the voltage applied across the liquid crystal layer is greater than the threshold voltage.

* * * * *